May 19, 1970          H. KUNERT          3,512,269
PROGRAMMED INSTRUCTION DEVICE
Filed Oct. 9, 1967          3 Sheets-Sheet 1
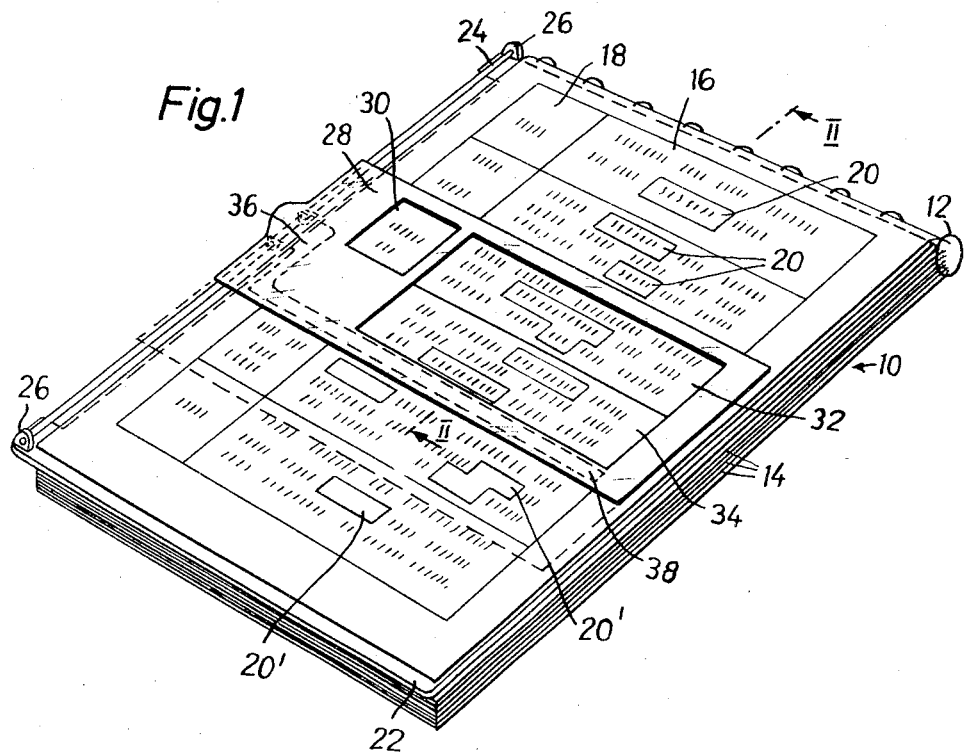
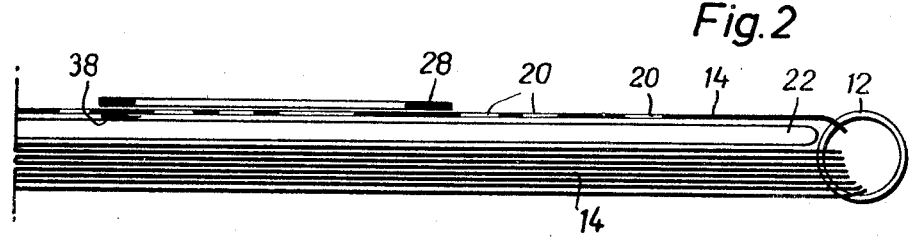
INVENTOR.
HEINZ KUNERT

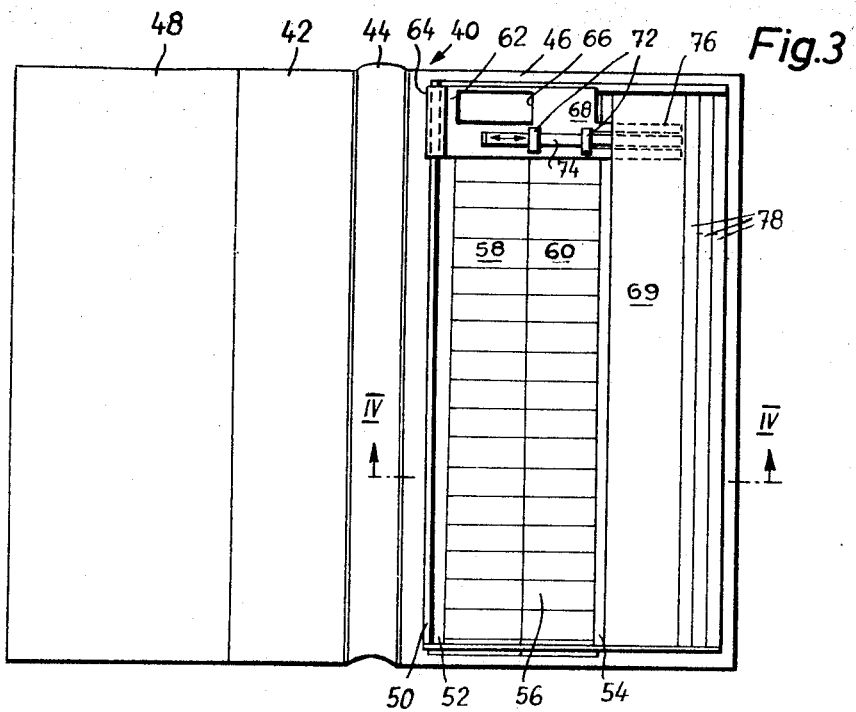
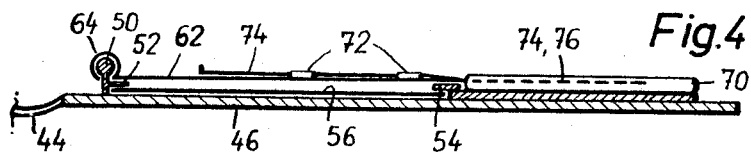
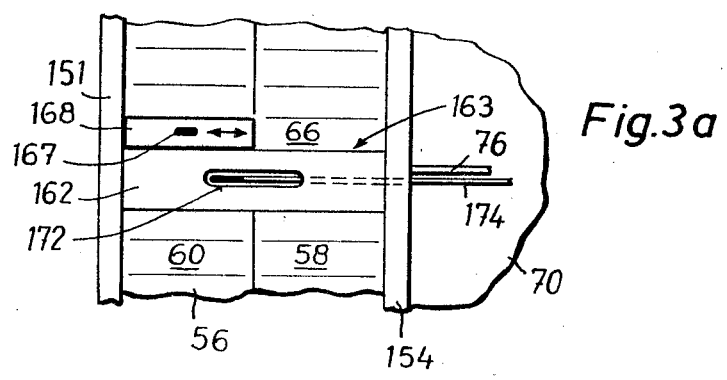

May 19, 1970 H. KUNERT 3,512,269
PROGRAMMED INSTRUCTION DEVICE
Filed Oct. 9, 1967 3 Sheets-Sheet 3
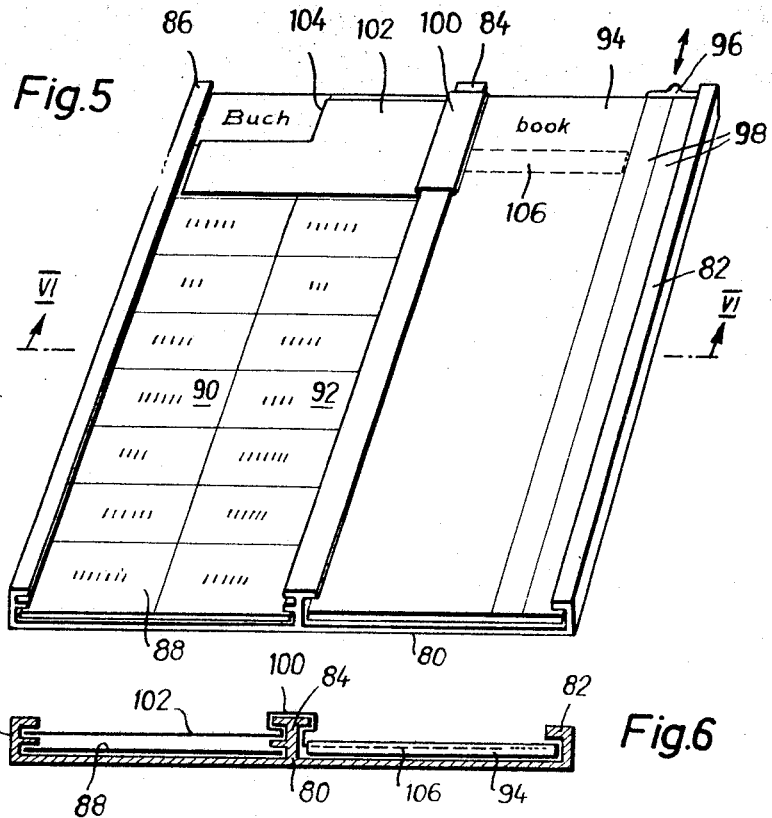
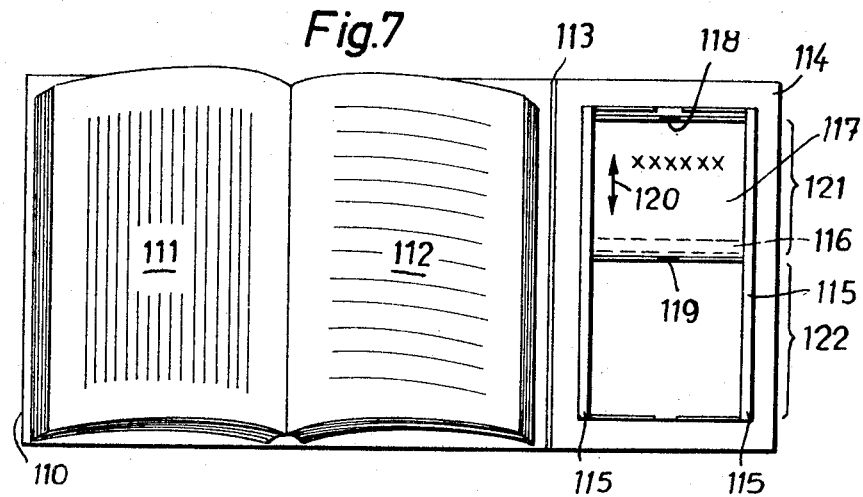
INVENTOR.
HEINZ KUNERT
BY 3,512,269
PROGRAMMED INSTRUCTION DEVICE
Heinz Kunert, 16 Agidienberger Strasse, 5
Cologne, Germany
Filed Oct. 9, 1967, Ser. No. 673,871
Claims priority, application Germany, Oct. 12, 1966,
K 60,443
Int. Cl. G09b 3/04
U.S. Cl. 35—9                                    13 Claims

ABSTRACT OF THE DISCLOSURE

A device for programmed instruction, comprising, in combination, information carrier means having a surface provided with at least one problem and an associated solution in visual representation, marking receiving means adjacent the information carrier means and operatively associated therewith for receiving visual markings representing a tentative reply to the problem, and slider means carried by one of the means and operative for exposing a portion of the surface provided with the problem and for concealing another portion provided with the associated solution while leaving unobstructed the marking receiving means associated with the information carrier means.

BACKGROUND OF THE INVENTION

The present invention relates to programmed instruction in general and more particularly to a device for programmed instruction.

Programmed construction is becoming more and more accepted for teaching of an almost endless variety of subjects in schools as well as in home study courses, in the instruction of shut-ins and for similar purposes. Basically, there are two different types of programmed instruction devices, those which are mechanical and/or electrical and which provide audio-visual effects, and printed instruction programs which may be in form of individual sheets, pads, books and the like. The present invention is particularly concerned with this latter type wherein the problems and solutions are printed or otherwise visually fixed on an information carrier in form of a sheet, page of a pad, page of a book, or the like.

In this type of programmed instruction device it is customary to provide problems, including questions which are intended to elicit the student's response in form of a solution to the problem, and to provide spaces in which the response, that is the solution can be entered. Other approaches are also known wherein the student simply familiarizes himself with the problem and is subsequently confronted with the solution without having to provide a written record of his own reply to the problem. However, educators are generally agreed that a requirement for providing a written solution before being confronted with the prepared answer is preferable for a variety of reasons. Firstly, the students must under these circumstances formulate their own reply to the problem and must clearly state this reply in writing. This is intended to teach the student a consequential approach in seeking a solution to a stated problem. Furthermore, the mechanical effort required to provide a written reply aids in fixing the solution in the mind of the student. This is particularly advantageous where the reply must be memorized, for instance by memorizing certain symbols, formulas, words, spelling or the like.

However, the written fixing of a solution by the student is possessed of two disadvantages. One of these is the rather strong aversion, particularly on the part of older students, to make written marks in a printed instruction program, for instance a book. This is occasioned by years of training in which the student has been told not to write into books because this is detrimental to their appearance and, if the books contain instructional material involving questions, makes them unsuitable for further use because his writing constitutes replies to these questions and thus prejudices the next reader of the book. The second problem, and the more important one, has to do with the fact that a student may frequently be less than certain of the correctness of his intended reply and may for this reason be reluctant to provide a written reply which is impossible or at least difficult to correct. This can result in an internal conflict which is considered by educators as being detrimental to the learning process. In situations where the instructional program, which word hereafter will be used to designate the entire range of printed and generally non-mechanical instruction devices, makes the solution to the problem readily visible to him if he but cares to consult the solution before supplying his own reply, he will frequenty do so and consult the proper solution rather than working out his own reply. Of course, if this possibility exists the student's motivation to develop his own reply to a pdoblem will be seriously diminished.

It has therefore long been thought that in the aforementioned type of instructional device maximum efficiency and benefits can be obtained if the device, while making a proper solution available to the student, provides him not only with a requirement to fix his own reply to the problem in writing but also enables the erasing of his own reply, so that his reply can be revised if and when needed. In this context it must be considered that the type of device which is here being discussed is intended to provide the solutions to the posed problems, solutions which can be used to check and if necessary correct his own replies and to thereby further the learning process, and that the device is not intended to provide a written record of the knowledge of the student on which to subsequently base the student's marks. In other words, this device is not intended to constitute a test of the student's knowledge but only to further the learning process and to impart to the student additional information. Therefore, there is no objection to providing solutions which are accessible to the student.

An arrangement of this type will bring with it not only economic advantages in that it can be reused repeatedly by the same student or by another, but will also eliminate conflict situations because it does not force the student to provide an unequivocal reply in writing which might subsequently be proven wrong when the student refers to the prepared solution. Therefore, the student will not be reluctant to develop and set down his own reply to a given problem.

On the other hand, the possibility of erasing an incorrect answer when the answer has been proven to be incorrect by reference to the prepared solution, and replacing the answer with a correct one will aid the student in retaining in his memory the correct reply and will remove the psychological frustration which might occur if the student sees himself confronted with a series of non-erasable incorrect replies. Finally, the possibility of reusing the program repeatedly is not only of economic importance but also aids the learning process. Thus it is well known that certain subject matter must be learned by "rote" such as spelling, foreign language vocabulary and the like. Arrangements which provide the advantages set forth above can be reused repeatedly and thus will provide the necessary repetition which is required in such circumstances.

SUMMARY OF THE INVENTION

The present invention provides the advantages which have been outlined above as desirable.

More particularly, the present invention provides a device for programmed instruction wherein the replies fixed in writing by the student can be erased, and new replies substituted.

In accordance with my invention I provide in one embodiment, a support means, and holding means thereon. An elongated information carrier is held by the holding means and has an exposed side which is provided with a visual representation of at least one problem and at least one solution. An opaque cover member is mounted on the device and overlies the exposed side on which it is slidable in opposite directions. The cover member has an opening which exposes the problem and it is so constructed that it will cover up the solution when the opening is in registry with the problem to expose the same. A marking-receiving means, whose nature will be more fully discussed subsequently, is arranged adjacent the information carrier and is adapted to receive visual markings which represent tentative solutions to the problem. Finally, I provide a suitable eraser means, which will also be more fully discussed hereafter, which forms a part of the device and which is arranged for the purpose of erasing the markings which have been made on the marking receiving means if and when such erasure becomes necessary.

In one embodiment of the invention, an information carrying sheet is provided on the support, and this sheet is provided with two adjacent columns, one of which constitutes the various problems and the other of which constitutes the solutions to these problems. Next to the information carrying sheet is a marking-receiving means in form of a suitable writing surface, and a sliding cover member is slidable over the two columns. The cover member is provided with a window, as pointed out before, which can be placed in registry with a problem and will not expose the solution to that particular problem when the window is in this position. The erasing means can be provided on the sliding member or cover member. This type of device is suited particularly well for foreign language instruction.

Control arrangements can be provided on my novel device, and particularly well on the embodiment just dicussed, and such control arrangements can consist in so arranging the erasing means that it will act only upon a strip-shaped portion of the writing surface, whereas the remainder of the writing surface may be divided into two or more—or even be constituted by a single—strip-shaped portions in which the student can make control markings in a manner which will still be described, which control markings can be separately erased by providing an auxiliary erasing means.

In another embodiment of the invention, the writing surface can be provided below the information carrier and the latter can be provided, usually in the problem column adjacent to a given problem, with cutouts through which the writing surface is partially exposed. The student then inserts his reply to a problem into the cutout, or more precisely, by writing in the cutout makes markings on the writing surface, and thereafter exposes the correct solution. If he wishes to correct his reply he manipulates the erasure means, which may be carried by the cover member and which may become activated when the cover member is moved in a given direction, namely in a direction away from the next-following problem.

The writing surface must of course be erasable for the purposes of the present invention. Such erasable writing surfaces are known in the art and do not in themselves constitute an inventive feature of the present invention. It is for instance known to provide a hard backing sheet on which there is arranged a colored foil, with a colorless foil overlying the colored foil. Pressure exerted on the colorless foil will then cause the colored foil to adhere locally to the colorless foil in the area where the pressure has been exerted. Thus, if a pencil or other pointed instrument is used to draw a line on the colorless foil thereby exerting pressure on the matter, the colored foil will adhere to the colorless foil along this line and will give the appearance of a colored line produced on the colorless foil. If, subsequently, the colored foil and the colorless foil are separated by being pulled or pushed apart, the adherence will be terminated and the markings produced will disappear. This type of writing surface is particularly well suited for the purpose of the present invention because it can be reused many times. An arrangement of this type is available commercially under the tradename "Printator." Of course, other erasable writing surfaces are equally well suited for the purposes of the present invention.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of one embodiment of the invention;

FIG. 2 is a section taken on the line II—II of FIG. 1;

FIG. 3 is a top-plan view of a further embodiment of the invention;

FIG. 3a is a modified embodiment of the embodiment shown in FIG. 3;

FIG. 4 is a section taken on the line IV—IV in FIG. 3;

FIG. 5 is a perspective view of an additional embodiment of the invention;

FIG. 6 is a section taken on the line VI—VI in FIG. 5; and

FIG. 7 illustrates a further embodiment of the invention.

DESCRIPTION OF THE PREFERRED EMBODIMENTS

Discussing now the drawing in detail, and firstly FIGS. 1 and 2 thereof, it will be seen that the embodiment illustrated in these figures requires the student to insert his replies into spaces left in the instruction program. The instruction program here is constituted by one or more— several illustrated—program sheets 14 which in the illustrated embodiment are bound together with wire links to a pad 10. Of course, it has already been intimated that a single such sheet 14 can be used.

Each of the sheets 14 has visually observably produced thereon an instructional program consisting of a problem field 16 and a solution field 18, which are each subdivided into a plurality of sections, each of which contains for instance one problem and one solution. Thus, the problems in each section of the problem field 16 may consist in a sentence in which one word has been omitted which is to be supplied by the student. The proper word is then shown in the corresponding section of the solution field 18. Unlike conventional arrangements of this type, where the student simply writes the missing word into the space left in the section of the problem field 16, a cutout 20 corresponding to the word to be supplied is provided in the respective section of the problem field 16.

A writing surface of erasable nature, for instance of the "Printator" type discussed before, is identified with reference numeral 22 and in this embodiment is placed below the uppermost sheet 14 of the pad 10. A guide bar 24 extends along one side of the writing surface 22, to which it is fastened by two holders 26. A slider 28 which for this purpose engages and is secured to the bar 24, is movable along the same and can also be turned about an axis constituted by the bar 24 so that, when a sheet 14 of the pad 10 is completed, this slider can be turned in this manner to permit removal of the sheet and proper positioning of the next following sheet. This turning movement can for instance be facilitated by providing an extension on the portion of the slider which engages the bar 24 so that the student need merely push on this extension to effect turning of the slider about the bar 24.

The slider 28 consists of opaque material as is evident from the drawing, and covers at least two consecutive sections of each program field 16 and 18. In the illustrated embodiment the slider 28 is provided with a window 30 which registers with the uppermost section of the solution field 18 which this slider can cover, whereas the window which is provided in the region of the problem field 16, consists of a first portion 32 located on the level of the window 30 and making visible the problem field associated with the solution visible in the window 30, and a portion 34 through which the next-following section—and therefore the next following problem—of the problem field 16 is visible. The window 30 and the portion 32 can be open or they can be covered with a clear foil if desired. A suitable erasing device which, if the writing surface is of the "Printator" type discussed earlier, may consist of a member which slides between the colored and the colorless foils thereof, is mounted on the slider 28, and is identified with reference numeral 36. The actual erasing portion of this device 36 is identified with reference numeral 38 and is located below the lower edge of the portion 34 of the window associated with the problem field 16.

In use of the device thus far described, the student will set the slider 28 at the upper edge of the pad 10 in such a manner that the window portion 34 exposes the uppermost section of the problem field 16. This closes off the uppermost corresponding section of the solution field 18. The writing surface 22 is visible through the cutout 20 and the student can then supply the required written reply by writing this onto the writing surface 22 through the cutout 20. Thereupon, the student moves the slider 28 downwardly by one section and can now see in the window 30 whether his reply was correct. He now supplies the additional two replies which are required in the next following section of the problem field 16 and whose corresponding section of the reply field 18 is covered by the slider. Now, the student again advances the slider 28 downwardly by one section. If he finds that his solution to the preceding problems was incorrect, the slider 28 can be moved upwardly again by two sections and the relies are automatically erased by the erasing device 36, 38 in the manner discussed earlier. Now, the slider 28 is again moved downwardly and the proper replies are inserted.

It is basically sufficient if the slider 28 is provided only with the window portion 34 and with the opaque portion juxtaposed with the window portion 34 and covering the solution section which is associated with the problem section exposed in the window portion 34. The window 30 and the window portion 32 could be eliminated. Also, the slider can be further modified in an advantageous manner by extending it downwardly below the window portion 34 but without providing it with any further cutouts. The purpose is to extend it in the manner suggested by the dashed line to assure that the next following section is covered so that the student is prevented from intentionally or accidentally seeing the solution in the solution field 18 before he reaches the associated problem and supplies his own reply.

When the slider 28 has advanced to the lowermost end of the sheet 14, and the sheet 14 is thus finished, the slider is tilted about the bar 24, the sheet 14 is removed, for instance by being flipped upwardly, the next-following sheet 14 is placed over the writing surface 22, the slider 28 advanced to the uppermost edge of the next following sheet 14 whereby the previous writing on the writing surface 22 is automatically erased and the device is ready for continued use. Thus, the individual sheets 14 can be reused almost indefinitely by the same student or by another student. The student is not forced to leave an improper reply unchanged for further inspection by others, and will therefore be more ready to venture his own reply rather than to search out the prepared solution without giving any thought to formulating his own reply.

Coming now to the embodiment of FIGS. 3 and 4 it will be seen that this differs from that of FIGS. 1 and 2 in that it employs an arrangement in form of a cover 40. This book cover 40 consists of a front cover 42, a back 44 and a rear cover 46. The front cover 42 is provided on its inside with a pocket 48 in which the program material can be stored. Of course, the pocket 48 can be omitted. Mounted on the inner side of the rear cover 46 adjacent and in parallelism with the back 44, is a rail 50 provided with an elongated bead and also with a laterally projecting extension 52. A center rail 54 extends in parallelism with the rail 50 approximately at the center of the rear cover 46 and is also provided with a projection extending oppositely the projection 52. A program sheet 56 can be inserted below the projection 52 and that provided on the center rail 54. This program sheet may be provided with a problem column 58 and a solution column 60 which are arranged parallel to the rail 50 side by side. On the other side of the rail 54 there is arranged a writing surface 70 of the type already discussed. A slider 62 consists of opaque material and is provided with a guide 64 which engages the bead of the rail 50. The slider 62 has an elongation, as seen in the direction of elongation of the column 58 and 60, which corresponds to at least two sections of these columns. In the upper portion it is provided with a window 66 which can be placed over the uppermost covered section of the problem column 58.

The writing surface 70 is subdivided in the illustrated embodiment into a reply field 69 and three strip-shaped control columns 78, all of which extend in parallelism with the guide rail 50. An eraser 76 of suitable type, for instance of the type outlined with reference to FIGS. 1 and 2, is provided on the slider 62 and located over the reply field 69 of the writing surface 70. A small slider 74 is mounted into brackets 72 for movement in the direction of the double-headed arrow and this constitutes a separate eraser for the control columns 78 and as shown in FIG. 3, is moved towards the right-hand side for effecting erasures in the control columns 78.

If it is assumed that the device according to FIGS. 3 and 4 is to be used in foreign language instruction, the words can be reproduced in one language in the problem column 58 and in the other language in the problem column 60. The student advances the slider 62 upwardly into the position shown in FIG. 3 and then sees the first word in the window 66, while the translation of this word in the associated reply column 60 is covered by the portion 68. In the field 69 the student then inserts his tentative reply whereupon the slider 62 is moved downwardly by one section. Now, the solution to the preceding problem becomes visible in the solution column and, if his reply has been correct, he may for instance make an affirmative mark, for instance a plus sign in the first of the control columns 78 opposite the solved problem. The window 66 exposes the problem word of the next section, and again his reply is entered in the field 69. The slider 62 is again advanced by one section and, if it is assumed that the reply was incorrect as determined by the now exposed printed solution, the slider can be moved upwardly again by two sections, whereby the eraser 76 automatically erases the last entry in the field 69. Then the slider is again moved downwardly and the proper entry is made. For control purposes the student may now make a suitable negative sign, for instance a minus sign, in the first control column 78 oppositely the problem which he had solved incorrectly. When the entire program on the sheet is completed the student will have in the first column a record of his performance. If the same program is worked through subsequently the student may make additional marks in the second and third of the control columns 78 and will thus provide himself with a control by means of which he can determine if and in what respects his performance has increased. When the student is completely finished with the program sheet, that is when the necessary or desired number of repetitions has occurred, the slider 74 of the FIG. 3 is advanced towards the right and the slider 62 is moved upwardly and downwardly once whereby the slider 74 erases the control marks made in the control columns 78 so that the device is now ready to accept the next control program sheet 56.

The embodiment of FIG. 3a is rather similar to that of FIGS. 3 and 4, except that the slider is identified with reference numeral 162 and is guided between two parallel rails 151 and 154. In the embodiment of FIG. 3a the cover portion 168 is slidable at the upper side edge 163 of the slider 162 in the direction of the double-headed arrows and in transverse direction. A handle 167 is provided on the portion 168 so that the latter can be moved to a left-hand position as illustrated in FIG. 3a, or to a right-hand position, depending upon whether it is the left-hand column 60 or the right-hand column 58 of the program sheet 56 in which the solutions are printed. The slider 174 corresponds to the slider 74 of FIG. 3 and in FIG. 3a is guided in a slot 172 provided in the slider 162.

Coming now to the embodiment of FIGS. 5 and 6 it will be seen that here a base plate 80 is provided on which there is arranged a T-shaped center rail 84 and two lateral rails 86 and 82 are located on opposite sides of the center rail 84. These rails are so constructed that, in the same manner as shown in FIG. 3, a program sheet 88 with problem column 90 and solution column 92 can be inserted between the rails 86 and 84 whereas the writing surface is inserted between the rails 82 and 84 and identified with reference numeral 94.

The slider 102 is provided with a guide 100 which surrounds the head of the T-shaped rail 84. As previously described the slider 102 here again covers at least two successive sections of the problem column 90 and the solution column 92. Over the uppermost section of the problem column 90 the slider 102 is provided with a window 104. An erasing member 106 is provided on the guide 100 and extends beyond the rail 84 towards the rail 86. This member is of the type described before and is of course associated with the writing surface 94 also in the manner discussed earlier. Control columns 98 are again provided, but unlike the preceding embodiment, a separately operated slider 96 is provided for erasing these control columns 98 or rather the marks made in them.

Operation of the device illustrated in FIGS. 5 and 6 substantially corresponds to that described in FIGS. 3 and 4. It need therefore not be particularly described in that it is readily understandable from the description rendered with reference to FIGS. 3 and 4.

Coming, finally, to the embodiment illustrated in FIG. 7, it will be seen that this is suited where the instruction program is supplied in form of a book. This book is identified with reference numeral 110 and may for instance always be provided with the solutions on the side 111 of a page and the problems which are provided on the preceding side identified with reference numeral 112. A cover portion 114 is turnable about a fold, hinge or the like 113 via which it is joined to the right-hand edge of the book-cover. Mounted on the cover portion 114 is the erasable writing surface 117 which is slidably movable in two rails 115 in the direction of the double-headed arrow 120. The erasing member 116 which corresponds to the erasing member 38 of FIG. 1 in its function, is mounted on the rails 115 intermediate the opposite ends thereof, and it is immovable contrary to previous embodiments. Small handles 118 and 119 are provided at the upper and lower ends of the writing surface 117 for facilitating movement of the same in the direction of the double-headed arrow 120. It is clear that when the writing surface 117 is in the uppermost position 121 as illustrated in FIG. 7, the student can write on this surface and that, if the surface is thereupon moved in downward direction to the lowermost position 122, such writing will be automatically erased by the strip or rod-shaped erasing member 116. Such movement in the direction of the double-headed arrow 120, and consequently automatic erasure of the writing, can be effected with one hand without even necessitating that the student puts down the writing instrumentality which he uses. Once the writing surface has been moved to the lowermost position 122, writing can again be effected on it and this will automatically be erased if the writing surface is subsequently returned to the uppermost position 121.

It is clear that the embodiments described herein can only represent examples of the present invention. A variety of modifications is of course possible without deviating in any manner from the invention. Thus, combinations of features of the embodiments of FIGS. 3–5 or those of FIGS. 1 and 2 can be made, just as other modifications may include differences in the construction and configuration of the sliders, the glides, the eraser, and the like. Thus, in FIG. 5, the rails 82, 84, 86 could be replaced with a smooth plate 80 on which only a single guide could be provided for the sheet 88, and the slider could be mounted on this plate 80 as a closed sleeve-shaped or ring-shaped member. It is also clear that various different types of erasable writing surfaces can be provided, of which the "Printator" type is only exemplary. Naturally, the erasing device must differ depending on the type of erasure which is required, and may also be of different configuration rather than only of different function. Thus, erasure may be effected chemically, magnetically or in accordance with other principles, depending upon the type of writing surface utilized, type of markings made and the type of erasing device which is supplied to effect the necessary erasure. Also, it is clear that the erasing devices need not be carried by the respective sliders, but can be separately mounted and may for instance be mechanically operative devices, chemically impregnated wipers, or of other types.

Without further analysis, the foregoing will so fully reveal the gist of the present invention that others can, by applying current knowledge readily adapt it for various modifications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A device for programmed instruction, comprising, in combination, support means; holding means on said support means; elongated information carrier means held by said holding means and having an exposed side provided with a visual representation of at least one problem and at least one solution, said carrier means having a cut-out; opaque cover means mounted on said device overlying said exposed side slidable therealong in opposite directions, said cover means having an opening exposing said problem and being constructed so as to cover said solution when said opening is in registry with said problem, and said cut-out being accessible when said opening is in such registry; marking receiving means located underneath said information carrier means so that visual marking representing tentative solutions to said problem may be made on portions of said marking receiving means which are accessible through said cut-out; and eraser means provided on said device and arranged for erasing markings on said marking receiving means.

2. A device for programmed instruction, comprising, in combination, support means; holding means on said support means; elongated information carrier means held by said holding means and having an exposed side provided with a visual representation of at least one problem and at least one solution; opaque cover means mounted on said device overlying said exposed side slidable therealong in opposite directions, said cover means having an opening exposing said problem and being so constructed as to cover said solution when said opening is in registry with said problem; marking and receiving means adjacent to said information carrier means and adapted to receive visual markings representing tentative solutions to said problem; and cancelling means connected for movement with said cover means so as to move during sliding of said cover means along said marking receiving means in engagement with the latter so as to cancel markings made thereon.

3. A device for programmed instruction as defined in claim 2; and further comprising a guide rail located on said support means intermediate said information carrier means and said marking receiving means and mounting said cover means for sliding movement thereof in said opposite directions.

4. A device for programmed instruction as defined in claim 2; and further comprising a guide rail located at one side of said support means adjacent said information carrier means and mounting said cover means for sliding movement thereof in said opposite directions.

5. A device for programmed instruction as defined in claim 2, wherein said marking receiving means is subdivided into at least two portions at least one of which extends parallel to the direction of movement of said cover means, said cancelling means being operative for cancelling markings on said one portion; and further comprising additional cancelling means operative for cancelling markings on said other portions.

6. A device for programmed instruction as defined in claim 2, wherein said cancelling means is mounted on said cover means and shiftable relative thereto transversely of the direction of movement thereof.

7. A device for programmed instruction as defined in claim 2, wherein said support means comprises one cover of a book having a front cover and a back cover.

8. A device for programmed instruction as defined in claim 7; and further comprising a pocket provided on the other of said covers and dimensioned to receive said information carrier means.

9. A device for programmed instruction as defined in claim 1; and further comprising guide means mounted on and extending along said marking receiving means laterally thereof and guiding said cover means for sliding movement of the latter in said opposite directions.

10. A device for programmed instruction as defined in claim 1, wherein said information carrier means comprises a plurality of individual sheets joined together and constituting a pad.

11. A device for programmed instruction as defined in claim 2, wherein said marking receiving means comprises a hard base member, a colorless foil overlying said base member, and a colored foil sandwiched between said colorless foil and said base member and adapted to locally adhere to said colorless foil in response to application of localized pressure against the same.

12. A device for programmed instruction as defined in claim 2, wherein said marking receiving means is mounted on said support means.

13. A device for programmed instruction as defined in claim 2, wherein said cancelling means is operative for cancelling markings on said marking receiving means in response to sliding movement of said cover means in one of said directions.

References Cited

UNITED STATES PATENTS

| 1,556,499 | 10/1915 | Deutsch | 35—66 |
| 2,475,698 | 7/1949 | Croker | 35—66 |
| 3,111,775 | 11/1963 | Schade | 35—9 |
| 3,131,485 | 5/1964 | Schade | 35—9 |

EUGENE R. CAPOZIO, Primary Examiner

W. H. GRIEB, Assistant Examiner

U.S. Cl. X.R.

35—66